(12) United States Patent
Yoo et al.

(10) Patent No.: US 11,630,984 B2
(45) Date of Patent: Apr. 18, 2023

(54) METHOD AND APPARATUS FOR ACCELERATING DATA PROCESSING IN NEURAL NETWORK

(71) Applicant: SEOUL NATIONAL UNIVERSITY R&DB FOUNDATION, Seoul (KR)

(72) Inventors: Sung Joo Yoo, Seoul (KR); Eun Hyeok Park, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 706 days.

(21) Appl. No.: 16/663,487

(22) Filed: Oct. 25, 2019

(65) Prior Publication Data

US 2020/0057934 A1 Feb. 20, 2020

Related U.S. Application Data

(63) Continuation of application No. PCT/KR2018/005022, filed on Apr. 30, 2018.

(30) Foreign Application Priority Data

Apr. 28, 2017 (KR) .................. 10-2017-0055001
Dec. 22, 2017 (KR) .................. 10-2017-0178747

(51) Int. Cl.
*G06N 3/04* (2006.01)
*G06K 9/62* (2022.01)

(52) U.S. Cl.
CPC ............. *G06N 3/04* (2013.01); *G06K 9/6267* (2013.01)

(58) Field of Classification Search
CPC ............................... G06K 9/6267; G06N 3/04

USPC .......................................................... 706/15
See application file for complete search history.

(56) References Cited

U.S. PATENT DOCUMENTS

| 9,406,017 B2 | 8/2016 | Hinton et al. |
| 10,417,525 B2 * | 9/2019 | Ji .......................... G06N 3/0454 |
| 10,831,444 B2 * | 11/2020 | El-Yaniv ................... G06F 7/48 |
| 10,949,736 B2 * | 3/2021 | Deisher ................ G06N 3/0454 |

(Continued)

FOREIGN PATENT DOCUMENTS

| JP | 2009-169439 A | 7/2009 |
| JP | 2011-022156 A | 2/2011 |
| KR | 10-2016-0034814 A | 3/2016 |

(Continued)

OTHER PUBLICATIONS

Hubara et al., "Quantized Neural Networks: Training Neural Networks with Low Precision Weights and Activations", 2016, retrieved from https://arxiv.org/abs/1609.07061, pp. 1-29. (Year: 2016).*

(Continued)

*Primary Examiner* — Ted T. Vo
(74) *Attorney, Agent, or Firm* — Korus Patent, LLC; Seong Il Jeong

(57) ABSTRACT

Proposed are a method and apparatus for accelerating data processing in a neural network. The apparatus for accelerating data processing in a neural network may include: a control unit configured to quantize data by at least one method according to a characteristic of data calculated at a node forming at least one layer constituting the neural network, and to separately perform calculation at the node according to the quantized data; and memory configured to store the quantized data.

14 Claims, 12 Drawing Sheets

(56) References Cited

U.S. PATENT DOCUMENTS 10,970,617 B2 * 4/2021 Cheng .................. G06K 9/6274
2014/0046885 A1 2/2014 Majumdar et al.

FOREIGN PATENT DOCUMENTS

| KR | 10-2016-0143505 A | 12/2016 |
|---|---|---|
| WO | 2016/099779 A1 | 6/2016 |
| WO | 2017/049496 A1 | 3/2017 |

OTHER PUBLICATIONS

Aydonat et al., "An OpenCL™ Deep Learning Accelerator on Arria 10", Feb. 2017, ACM, pp. 55-64. (Year: 2017).*
Sze et al., "Efficient Processing of Deep Neural Networks: A Tutorial and Survey", 2017, retreived from https://arxiv.org/abs/1703.09039, pp. 1-32. (Year: 2017).*
Song Han, Huizi Mao, William J. Dally, 'A Deep Neural Network Compression Pipeline: Pruning, Quantization, Huffman Encoding', arXiv:1510.00149v1 [cs.CV], Oct. 1, 2015, https://pdfs.semanticscholar.org/397d/e65a9a815ec39b3704a79341d687205bc80a.pdf.

* cited by examiner

METHOD AND APPARATUS FOR ACCELERATING DATA PROCESSING IN NEURAL NETWORK

BACKGROUND OF THE INVENTION

Field of the Invention

Embodiments disclosed herein relate to a method and apparatus for accelerating data processing in a neural network, and more specifically to a method and apparatus which vary a quantization method, to be applied to data, depending on the value of the data on a neural network and separately perform calculation according to the number of bits of quantized data, thereby accelerating data processing.

Year 2017 Project Number and Acknowledgement
1. Project No.: 1711058249
2. Acknowledgement: This work was supported by the National Research Foundation of Korea grant funded by the Ministry of Science, ICT & Future Planning (PF Class Heterogeneous High Performance Computer Development, NRF-2016M3C4A7952601).

Description of Related Art

A neural network is an information processing technology which imitates the advanced information processing mechanism of the biological nervous system in an engineering manner and performs complex control while correlating input and output in a precise manner. In a neural network, three types of neuron (neural cells) models, including an input layer adapted to send signals from switches or sensors, a hidden layer adapted to adjust correlations while prioritizing input and output based on the information thereof, and an output layer adapted to calculate and output a required control amount based on information, are interconnected to one another and form a network.

As such deep learning-based neural networks require large-capacity memory, new memory, such as phase change memory (PCM), is commonly used as memory which provides large capacity for cost.

The new memory requires a lot of current because it changes the states of cells constituting the memory by writing data to the memory. In contrast, when data is read from the memory, the data can be read using a small amount of current because only the current states of the cells are sensed.

However, the new memory has a problem in that the number of writes is generally limited to a maximum of 100,000 due to the write operation of changing the states of cells.

In connection with this, Korean Patent Application Publication No. 10-2001-0105425, which is a background technology document, relates to a method for predicting the operation of an MFSFET device, which is a nonvolatile memory device, and also relates to an adaptive learning circuit of a neuro-device using the device. These can only predict the operation of a nonvolatile memory device using a method of controlling the flow of current by switching the polarization of a gate ferroelectric element, and do not solve the problem which is caused by the limitation to the number of writes of the new memory.

Therefore, there is a need for a technology which is capable of overcoming the above-described problems.

Meanwhile, the above-described background technology corresponds to technical information which has been possessed by the present inventor in order to contrive the present invention or which has been obtained in the process of contriving the present invention, and can not necessarily be regarded as a well-known technology which had been known to the public prior to the filing of the present invention.

BRIEF SUMMARY OF THE INVENTION

Technical Problem

An object of embodiments disclosed herein is to propose a neural network acceleration method and apparatus having different data formats for a neural network, which can reduce data to be written to memory by reducing the number of bits used to process data.

Furthermore, an object of embodiments disclosed herein is to propose a neural network acceleration method and apparatus having different data formats for a neural network, which can apply quantization varying depending on the distribution of data in order to construct the data formats with a small number of bits while maintaining the quality of the output of the neural network.

In addition, an object of embodiments disclosed herein is to propose a neural network acceleration method and apparatus having different data formats for a neural network, which can reduce a computational load by performing calculation varying depending on the values of data even when pieces of data quantized by different methods coexist with each other.

Technical Solution

As a technical solution for accomplishing the above objects, according to an embodiment, there is provided an apparatus for accelerating data processing on a neural network, the apparatus including: a control unit configured to quantize data by at least one method according to a characteristic of data calculated at a node forming at least one layer constituting the neural network, and to separately perform calculation at the node according to the quantized data; and memory configured to store the quantized data.

According to another embodiment, there is provided a method for accelerating data processing on a neural network, the method including: quantizing data by at least one method according to a characteristic of data calculated at a node forming at least one layer constituting the neural network; storing the quantized data; and separately performing calculation at the node according to the quantized data.

Advantageous Effects

According to any one of the above-described technical solutions, the embodiments disclosed herein can propose the neural network acceleration method and apparatus having different data formats for a neural network, which can reduce data to be written to memory by reducing the number of bits used to process data.

Furthermore, according to any one of the above-described technical solutions, the embodiments disclosed herein can propose the neural network acceleration method and apparatus having different data formats for a neural network, which can apply quantization varying depending on the distribution of data in order to construct the data formats with a small number of bits while maintaining the quality of the output of the neural network.

In addition, according to any one of the above-described technical solutions, the embodiments disclosed herein can propose the neural network acceleration method and apparatus having different data formats for a neural network, which can reduce a computational load by performing calculation varying depending on the values of data even when pieces of data quantized by different methods coexist with each other.

The effects which can be obtained by the embodiments disclosed herein are not limited to the above-described effects, and other effects which have not been described above will be apparently understood by those having ordinary skill in the art, to which the present invention pertains, from the following description.

BRIEF DESCRIPTION OF THE SEVERAL VIEWS OF THE DRAWING(S)

DETAILED DESCRIPTION OF THE INVENTION

Mode for Invention

Figure 1:
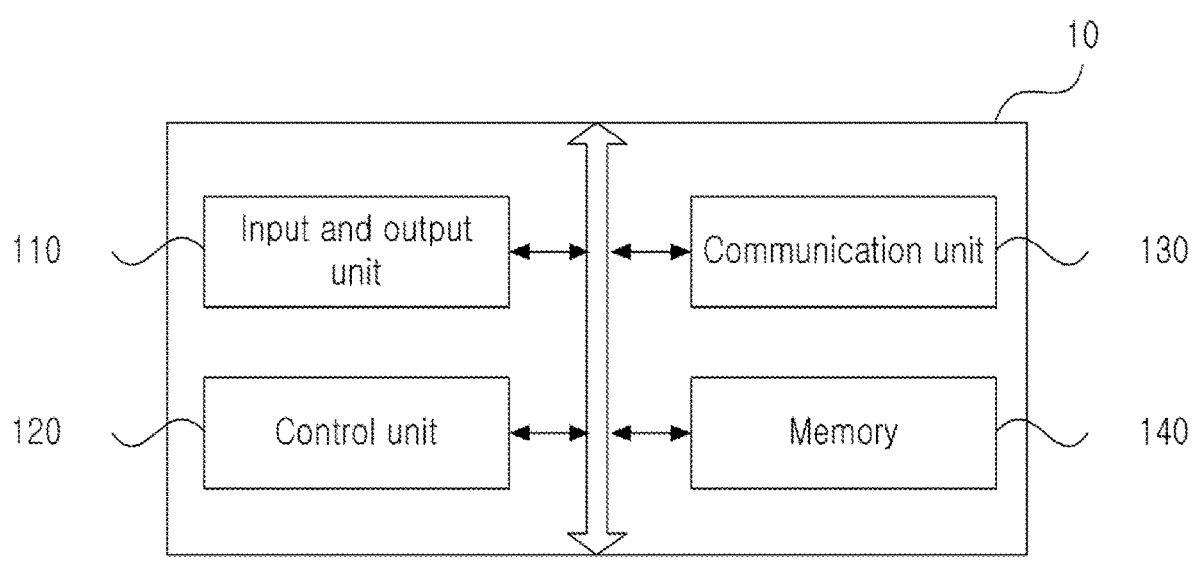
FIG. 1 is a block diagram showing a neural network acceleration apparatus according to an embodiment.

Various embodiments will be described in detail below with reference to the accompanying drawings. The following embodiments may be modified to various different forms and then practiced. In order to more clearly illustrate features of the embodiments, detailed descriptions of items which are well known to those having ordinary skill in the art to which the following embodiments pertain will be omitted. Furthermore, in the drawings, portions unrelated to descriptions of the embodiments will be omitted. Throughout the specification, like reference symbols will be assigned to like portions.

Throughout the specification, when one component is described as being "connected" to another component, this includes not only a case where the one component is 'directly connected' to the other component but also a case where the one component is 'connected to the other component with a third component disposed therebetween.' Furthermore, when one portion is described as "including" one component, this does not mean that the portion does not exclude another component but means that the portion may further include another component, unless explicitly described to the contrary.

The embodiments will be described in detail below with reference to the accompanying drawings.

Prior to the following description, the meanings of the terms used below will be defined first.

In the following, the term 'neural network' may include an input layer, at least one hidden layer, and an output layer, and each layer may include at least one node. Furthermore, a node of each layer may form a connection with a node of a subsequent layer.

Furthermore, the term 'data' refers to the information which is input to or output from a node of each layer of a neural network. It may includes a weight adapted to determine the intensity of reflection of data which is input to a subsequent layer when it is transmitted to the subsequent layer and an activation which is data input to and output from a node.

Terms requiring descriptions, other than the terms defined above, will be separately described below.

FIG. 1 is a block diagram illustrating a neural network acceleration apparatus 10 according to an embodiment.

The neural network acceleration apparatus 10 may be implemented as a computer, a mobile terminal, a television, a wearable device, or the like which can access a remote server or can be connected to another terminal and a server over a network N. In this case, the computer includes, e.g., a notebook, a desktop, a laptop, and the like each equipped with a web browser. The portable terminal is, e.g., a wireless communication device capable of guaranteeing portability and mobility, and may include all types of handheld wireless communication devices, such as a Personal Communication System (PCS) terminal, a Personal Digital Cellular (PDC) terminal, a Personal Handyphone System (PHS) terminal, a Personal Digital Assistant (PDA), a Global System for Mobile communications (GSM) terminal, an International Mobile Telecommunication (IMT)-2000 terminal, a Code Division Multiple Access (CDMA)-2000 terminal, a W-Code Division Multiple Access (W-CDMA) terminal, a Wireless Broadband (Wibro) Internet terminal, a smartphone, a Mobile Worldwide Interoperability for Microwave Access (mobile WiMAX) terminal, and the like. Furthermore, the television may include an Internet Protocol Television (IPTV), an Internet Television (Internet TV), a terrestrial TV, a cable TV, and the like. Moreover, the wearable device is an information processing device of a type which can be directly worn on a human body, such as a watch, glasses, an accessory, clothing, shoes, or the like, and can access a remote server or be connected to another terminal directly or via another information processing device over a network.

Referring to FIG. 1, the neural network acceleration apparatus 10 according to the embodiment may include an input and output unit 110, a control unit 120, a communication unit 130, and memory 140.

The input and output unit 110 may include an input unit configured to receive input from a user, and an output unit configured to display information such as the results of performance of a task, the status of the neural network acceleration apparatus 10, etc. For example, the input and output unit 110 may include an operation panel configured to receive user input, and a display panel configured to display screens.

More specifically, the input unit may include devices capable of receiving various types of user input, such as a keyboard, physical buttons, a touch screen, a camera, or a microphone. Furthermore, the output unit may include a display panel, a speaker, etc. However, the input and output unit 110 is not limited thereto, but may include configurations capable of supporting various types of input and output.

The control unit 120 controls the overall operation of the neural network acceleration apparatus 10, and may include a processor, such as a CPU or the like. The control unit 120 may control other components included in the neural network acceleration apparatus 10 so that they can perform an operation corresponding to user input received via the input and output unit 110.

For example, the control unit 120 may execute a program stored in the memory 140, may read a file stored in the memory 140, or may store a new file in the memory 140.

The control unit 120 may quantize data, used at a node forming at least one layer constituting a neural network, by at least one method.

In other words, the control unit 120 may separately apply a high-precision quantization method to a small number of pieces of outlier data and a low-precision quantization method to normal data, which is most of the remaining data, based on data values on the neural network.

According to an embodiment, the control unit 120 may obtain the distribution of the values of data based on data values on the neural network, and may separate data into at least one data group based on the distribution of the data.

For example, the control unit 120 may obtain the distribution of weights based on values by counting the weights on the neural network according to values based on the values of the weights, and may set intervals based on the numbers of weights counted for respective weight values. In this case, the control unit 120 may set an interval to a smaller value when the absolute value of a corresponding weight is closer to 0, and may set an interval to a larger value when the absolute value of a corresponding weight is larger than 0.

Alternatively, for example, based on the number of weights, the control unit 120 may set a weight value interval to 0.05 when the number of weights is larger than a preset number, and may set a weight value interval to 0.1 when the number of weights is equal to or lower than the preset number.

Furthermore, the control unit 120 may determine a quantization method, to be applied to data, according to a characteristic of the data included in each interval for at least one interval.

For example, the control unit 120 may apply a high-precision quantization method in which the number of bits representing data is 16 bits to an interval which is equal to or larger than 0.4 and has a larger weight value, and may apply a low-precision quantization method in which the number of bits representing data is 8 bits to an interval in which data values are lower than 0.4.

The control unit 120 applies different quantization methods to respective intervals based on the distribution of data as described above, so that even when the distribution of data has a long tail shape extending laterally due to large-value outlier data, quantization is performed using a limited number of bits, thereby increasing calculation speed and also decreasing a reduction in the quality of neural network output attributable to the quantization of data belonging to the long tail area of data.

Thereafter, the control unit 120 may store data in a buffer on the memory 140, and may vary a calculation method depending on the number of bits representing the data stored in the buffer.

For this purpose, the control unit 120 may classify data into outlier data and normal data according to the format of the data.

According to an embodiment, the control unit 120 may classify an activation as any one of an outlier activation larger than the preset number of bits and a normal activation equal to or smaller than the preset number of bits based on the number of bits representing a quantized activation included in data.

For example, the control unit 120 may determine whether the number of bits representing an activation is larger than 8 bits, and may classify the activation as an outlier activation larger than 8 bits and a normal activation equal to or smaller than 8 bits.

Furthermore, the control unit 120 may calculate a normal activation and an outlier activation in different manners.

According to an embodiment, when an activation which is input to a node is a normal activation, the control unit 120 may perform calculation via a normal calculation group which calculates a normal activation.

For example, the control unit 120 may transmit the normal activation, which is 16 4-bit activations stored in the buffer of the memory 140, to the cluster activation buffer of the normal calculation group in order to calculate the normal activation, and may move weights to the cluster weight buffer of the normal calculation group.

In this case, according to an embodiment, the cluster weight buffer may be configured in the form of a table, and each row of the table may include 8-bit pointers and 4-bit index values in order to represent normal weights, which are 16 4-bit weights, and an outlier weight, which is a 8-bit weight. Furthermore, in the cluster activation buffer, normal activations, which are 16 4-bit activations, may be constructed as a single row.

Furthermore, the control unit 120 may calculate the weights stored in the cluster weight buffer and the activations stored in the cluster activation buffer in parallel.

For example, the control unit 120 may allocate 16 weights from the cluster weight buffer and 16 activations from the cluster activation buffer to 16 calculation units which constituting the normal calculation group. Furthermore, the control unit 120 may perform a convolution calculation between one 4-bit weight and one 4-bit activation in one cycle via the calculation unit. Thereafter, the control unit 120 may combine results obtained in 16 respective calculation units, and may store the result of the combination in a buffer.

In this case, when there is an outlier weight among weights stored in the cluster weight buffer, the control unit 120 may calculate the outlier weight and an activation in two cycles.

For example, when there is one 8-bit outlier weight among 16 weights, the control unit 120 may perform a convolution calculation between an outlier weight and an activation in two cycles by performing a 4-bit convolution calculation between the four upper bits (the four most significant bits (MSBs)) of an 8-bit outlier weight and a 4-bit activation, performing a 4-bit convolution calculation between the remaining four lower bits and the activation, and summing the results.

According to another embodiment, when an activation which is input to a node is an outlier activation, the control unit 120 may perform calculation via an outlier calculation group which calculates an outlier activation.

For example, the control unit 120 may obtain 16 16-bit activations, which are outlier activations stored in the buffer, and 16 weights from the cluster weight buffer, may allocate the 16 16-bit activations and 16 weights to 16 respective calculation units constituting the outlier calculation group, and may perform convolution calculations in parallel.

In this case, when one outlier weight is included in 16 weights, the control unit 120 may perform calculations via two calculation units in parallel by performing a convolution calculation between the upper bits of the outlier weight and a 16-bit activation via a first calculation unit and performing a calculation between the lower bits of the outlier weight and the 16 bit activation via a second calculation unit.

Thereafter, the control unit 120 may store a calculation result at the node in a buffer based on the result of the calculation via the normal calculation group and the result of the calculation via the outlier calculation group.

For example, the control unit 120 may access two buffers of a cluster output tri-buffer composed of three buffers, may sum a previous calculation result and a new result obtained via the normal calculation group, and may store a sum. Thereafter, the control unit 120 may calculate a final result by summing the calculation result via the outlier calculation group and the result stored in the cluster output tri-buffer.

A calculation group is selectively used according to a quantization method for data at a node of the neural network which processes calculation, and thus the number of calculations using data corresponding to a long tail in the distribution of data can be considerably reduced, thereby significantly reducing a computational load and also minimizing the error of the neural network's result attributable to quantization.

The communication unit 130 may perform wired/wireless communication with another device or the network. For this purpose, the communication unit 130 may include a communication module which supports at least one of various wired/wireless communication methods. For example, the communication module may be implemented in the form of a chipset.

The wireless communication supported by the communication unit 130 may be, for example, Wireless Fidelity (Wi-Fi), Wi-Fi Direct, Bluetooth, Ultra Wide Band (UWB), Near Field Communication (NFC), or the like. Furthermore, the wired communication supported by the communication unit 130 may be, for example, USB, High Definition Multimedia Interface (HDMI), or the like.

Various types of data, such as a file, an application, and a program, may be installed and stored in the memory 140. The control unit 120 may access and use the data stored in the memory 140, or may store new data in the memory 140. Furthermore, the control unit 120 may execute a program installed in the memory 140. Referring to FIG. 1, a program for performing a quantization method may be installed in the memory 140.

The memory 140 may store the data calculated via the normal calculation group or outlier calculation group of the control unit 120.

For this purpose, buffers may be allocated to the memory 140. For example, there may be allocated a buffer configured to store data, a cluster activation buffer configured to store normal activations, a cluster weight buffer configured to store weights, and a cluster result tri-buffer configured to store the results calculated via the calculation groups.

Figure 2:
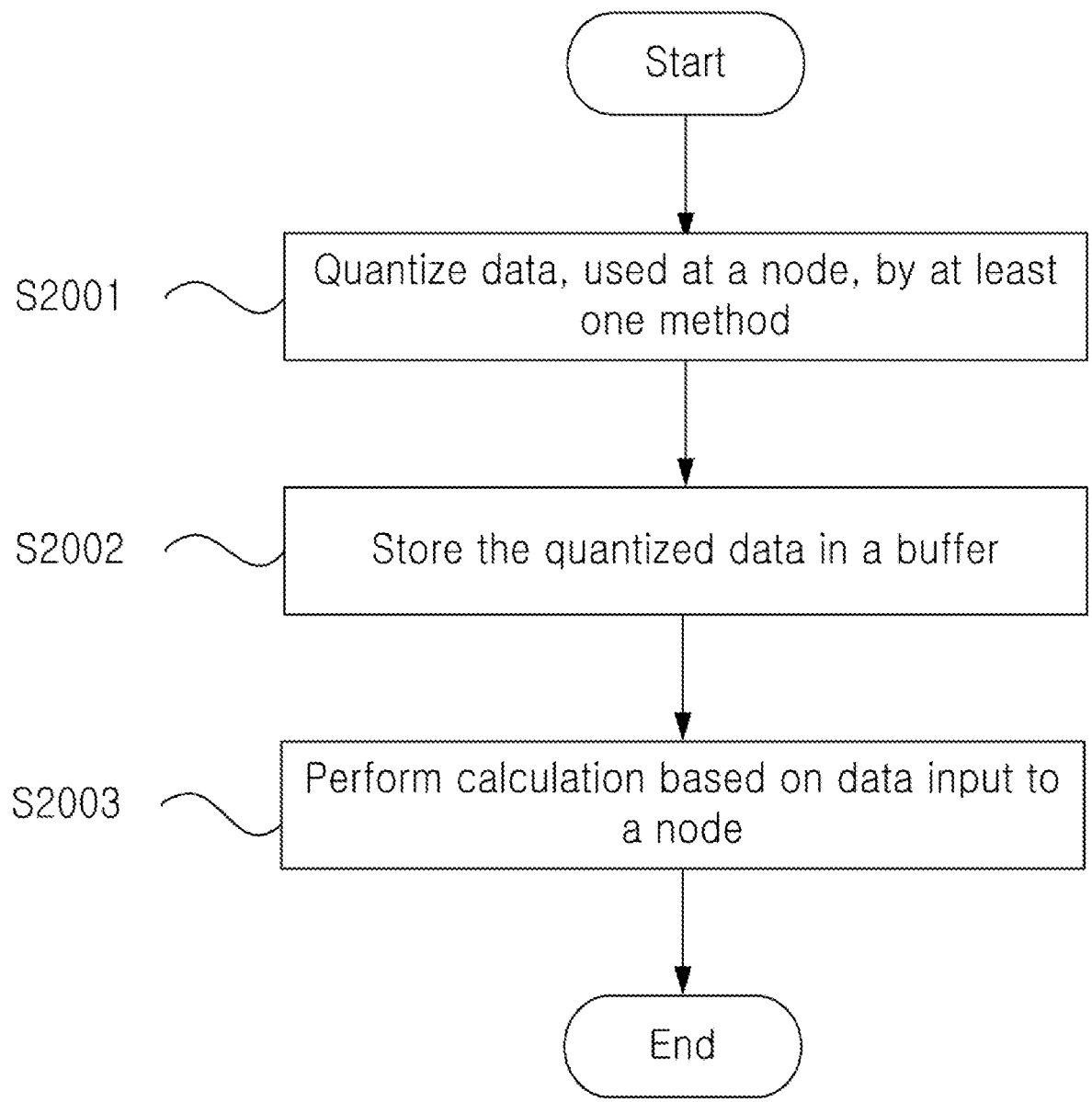
FIG. 2 is a flowchart showing a neural network acceleration method according to an embodiment.

FIG. 2 is a flowchart showing a neural network acceleration method according to an embodiment.

The neural network acceleration method according to the embodiment shown in FIG. 2 includes steps which are performed in a time-series manner in the neural network acceleration apparatus 10 shown in FIG. 1. Accordingly, the descriptions which are omitted below but are given above in conjunction with the neural network acceleration apparatus 10 shown in FIG. 1 may be also applied to the neural network acceleration method according to the embodiment shown in FIG. 2.

First, at step S2001, the neural network acceleration apparatus 10 may quantize data, used at a node forming at least one layer constituting a neural network, by at least one method.

According to an embodiment, the neural network acceleration apparatus 10 may obtain the distribution of data used within the neural network based on the range of the values that the data can have, and may set the intervals of data values in each of which the same quantization method will be performed, based on the distribution of the data.

For example, when a weight value, which is the intensity at which data is reflected into at least one node on the layer constituting the neural network, is determined by learning, the neural network acceleration apparatus 10 may obtain the distribution of weight values by counting weights having the same value based on the values of the weights on the neural network. Furthermore, the neural network acceleration apparatus 10 may set the interval of weight values, in each of which the same quantization method will be performed, in inverse proportion to the number of weights, and may set the interval of weight values, in each of which the same quantization method will be performed, to a larger value for an interval in which the number of pieces of data is smaller.

Figure 3:
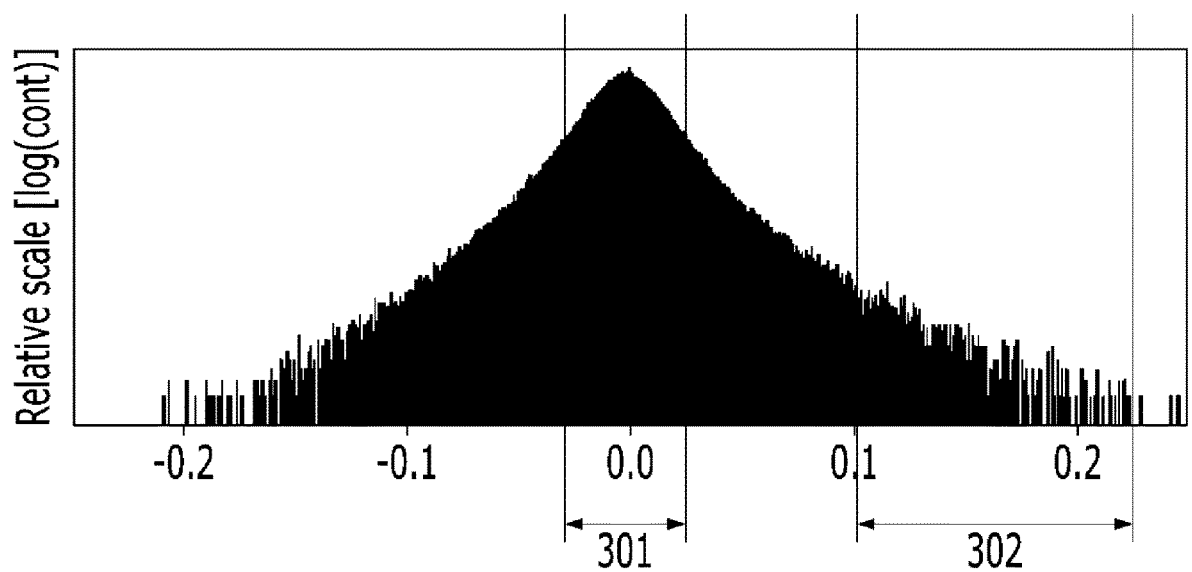
FIGS. 3 to 10 are reference views illustrating the neural network acceleration method according to the embodiment.

FIG. 3 is a graph in which intervals are set in the distribution of weights. Referring to this drawing, the neural network acceleration apparatus 10 may set an interval 301 to 0.05 in the interval from 0 to 0.1 in which the number of weights is large, and may set an interval 302 to 0.1 in the interval from 0.1 to 0.4 in which the number of weights is large.

Furthermore, the neural network acceleration apparatus 10 may apply a unique quantization method to at least one interval set based on the distribution of data, and may vary the number of bits of data attributable to quantization depending on the error between the data and quantized data.

According to an embodiment, the neural network acceleration apparatus 10 may perform a high-precision quantization method on outlier data, which is data falling within an interval exceeding a preset value, and may perform a low-precision quantization method on normal data lower than the preset value, based on the values of data falling within a set interval.

For example, the neural network acceleration apparatus 10 may apply a high-precision quantization method in which the number of bits is 16 bits to data falling within an interval, which is equal to or larger than 0.4 and has a larger weight value, and each having a larger quantization error, and may apply a low-precision quantization method in which the number of bits is 8 bits to data falling within an interval in which data values are lower than 0.4 and each having a small quantization error.

Figure 4:
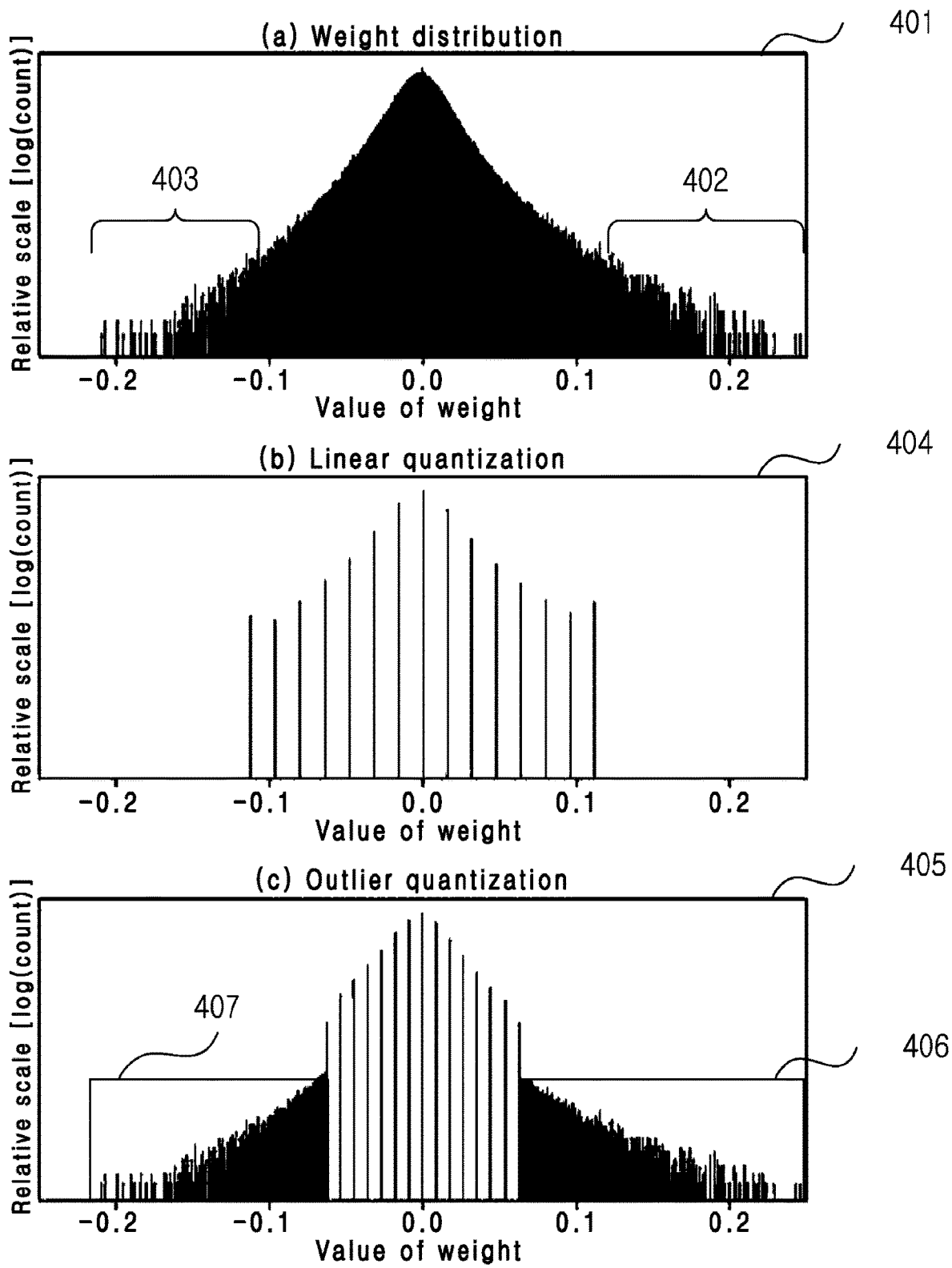

FIG. 4 is a graph showing the distribution of values obtained by performing different quantization methods based on the distribution of weights included in data on the neural network acceleration apparatus 10.

Referring to FIG. 4, as to weight values on a neural network, the distribution of weight values on a first graph 401 is wide due to a small number of outlier weights 402 and 403 each having a large absolute value. Accordingly, when a conventional linear quantization method is applied, a large number of quantization errors occur, as shown in a second graph 404.

In contrast, the neural network acceleration apparatus 10 may classify weights into outlier weights 402 and 403 and the remaining weights based on the values of the weights, as shown in a third graph 405, and may apply different quantization methods for respective intervals. Quantization errors for the values of the outlier weights can be reduced by applying the high-precision quantization method to the outlier weights 406 and 407, and weights can be represented using a small number of bits by applying the low-precision quantization to normal weights.

The present invention can represent data with a small number of bits and reduce quantization errors by performing different quantization methods on data compared to a conventional case where than an uniform quantization method (e.g., linear quantization or log quantization) is performed on all data, thereby maintaining the quantity of the output of the neural network.

Thereafter, the neural network acceleration apparatus 10 stores quantized data in the buffer at step S2002.

Figure 5:
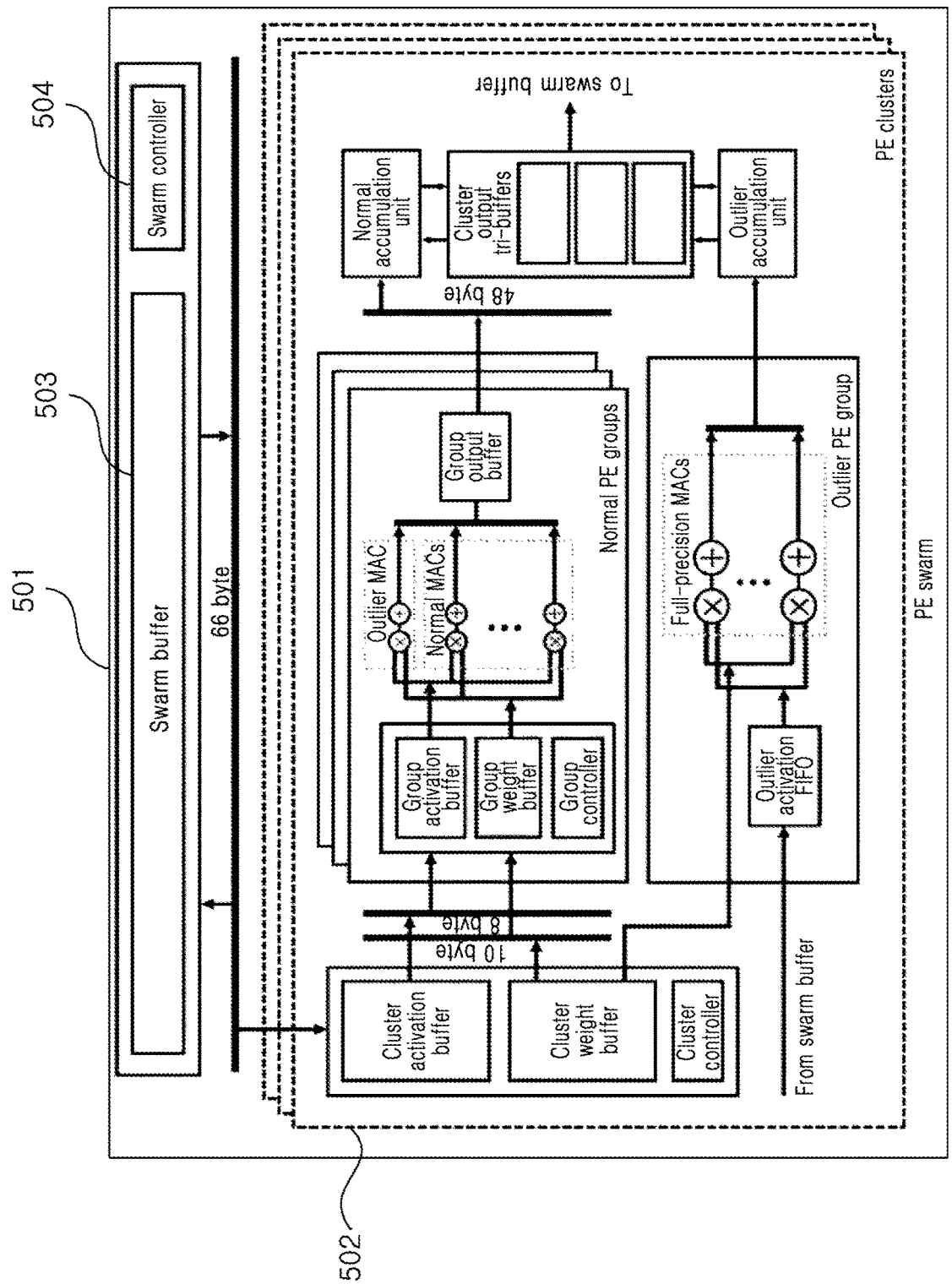

FIG. 5 is a view showing an example of the structure of a neural network acceleration apparatus 10 in which outlier data is taken into account. Referring to this drawing, the neural network acceleration apparatus 10 may include a PE swarm 501, which is the highest ranking, and the PE swarm 501 may include a PE cluster 502, a swarm buffer 503 configured to store information calculated in the PE cluster 502, and a swarm controller 504 configured to control the operation of the PE cluster 502 and communication with main memory. The neural network acceleration apparatus 10 may store data, to be quantized and calculated, in the PE swarm buffer 503.

Furthermore, the neural network acceleration apparatus 10 may perform calculation based on data input to the node at step S2003.

For this purpose, the neural network acceleration apparatus 10 may classify activations into outlier activations and normal activations based on the quantization format of input data, and may calculate the outlier and normal activations in different manners.

For example, based on the bits of an activation obtained from the buffer, the neural network acceleration apparatus 10 may classify the activation as a normal activation when the bits are smaller than 16 bits, and may classify the activation as an outlier activation when the bits are 16 bits.

Furthermore, the neural network acceleration apparatus 10 may separate activations into normal activations and outlier activations, and may calculate them.

In this case, the neural network acceleration apparatus 10 may improve performance by increasing the operating rates of the calculation groups, calculating data, through scheduling.

Figure 6:
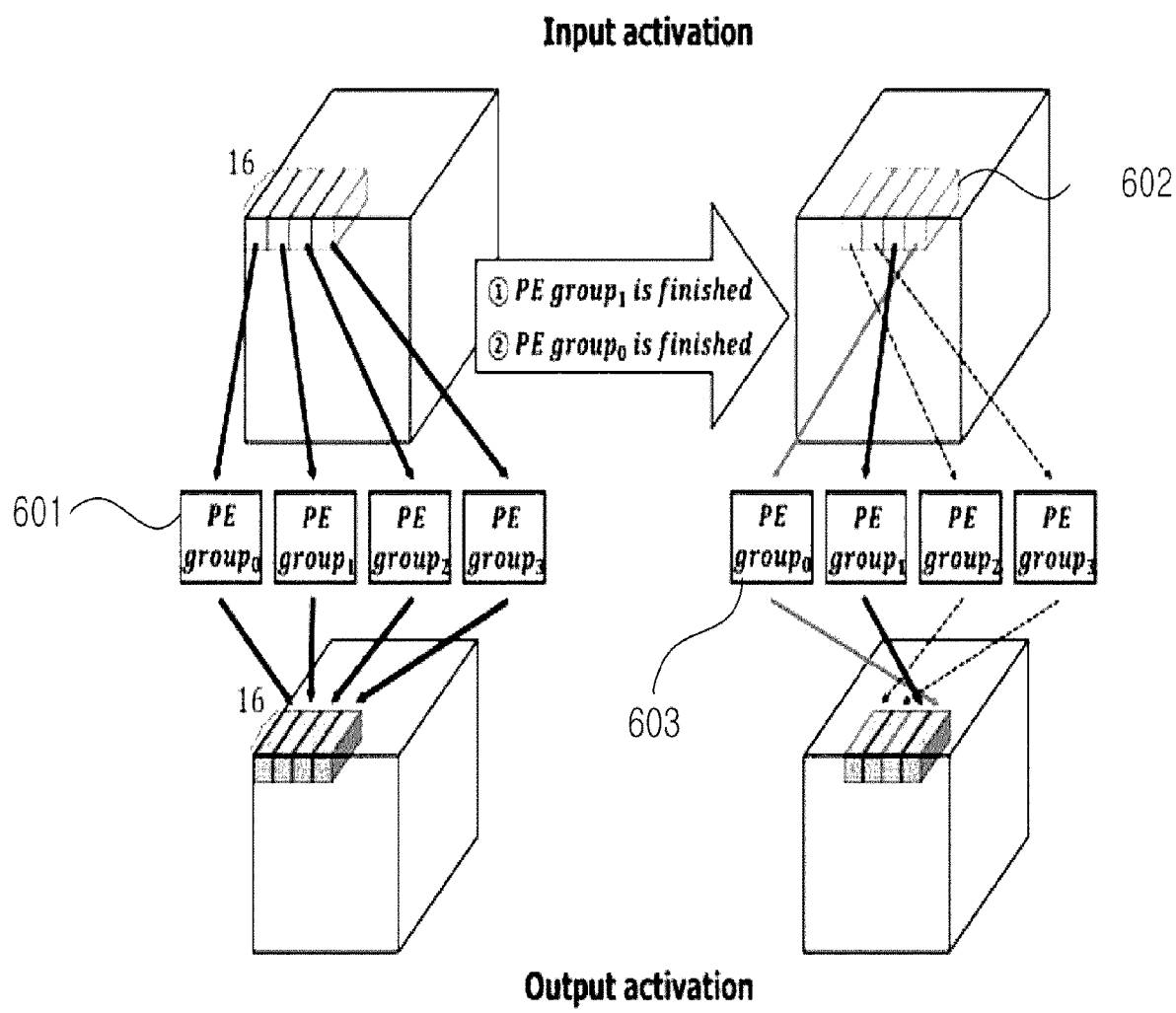

FIG. 6 a view showing an example of the scheduling of calculation groups. The neural network acceleration apparatus 10 obtains and calculates a 1×1×16 activation and generates the 1×1×16 activation as output through the calculation group. Since the neural network acceleration apparatus 10 calculates only an activation other than 0, and allocates a new 1×1×16 activation 602 to a first calculation group 603 after a first calculation group 601 has finished calculation based on the number of activations other than 0, thereby allowing calculation to be continuously performed.

According to an embodiment, when a normal activation is input, the neural network acceleration apparatus 10 may store a normal activation and a weight in the buffer, and may calculate them via the normal calculation group.

Figure 7:
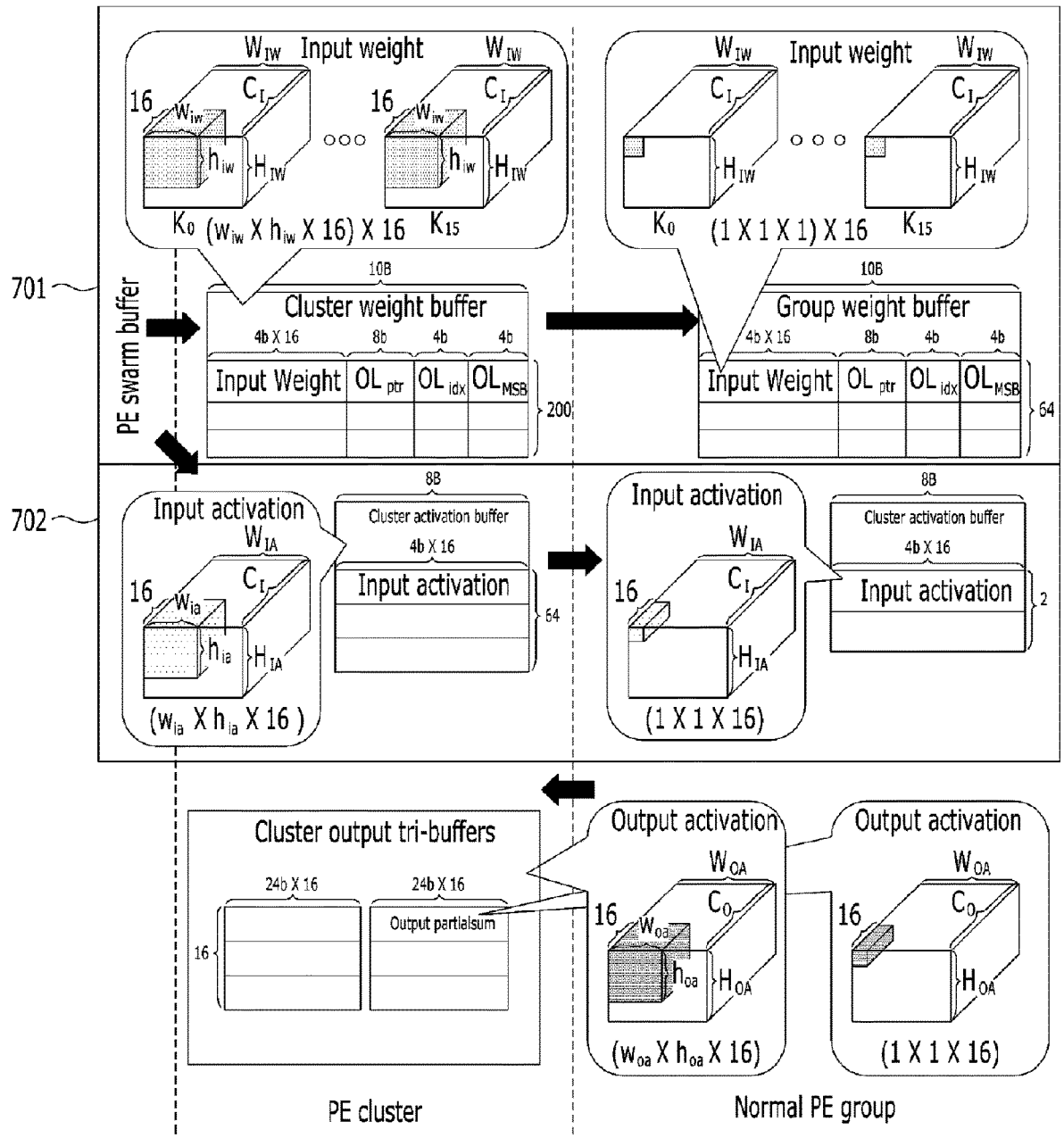

FIG. 7 is a view showing an example of the internal operation of the PE cluster of the neural network acceleration apparatus 10. Referring to this drawing, the neural network acceleration apparatus 10 may obtain 16 4-bit weights from the buffer for each row, and may store them in a cluster weight buffer 701 constructed in the form of a table. Furthermore, the neural network acceleration apparatus 10 may obtain 16 4-bit activations from the buffer, and may store them in a cluster activation buffer 702.

Furthermore, the neural network acceleration apparatus 10 may perform a convolution calculation between the normal activation and weight stored in the buffers.

For example, the neural network acceleration apparatus 10 may perform a convolution calculation between a 4-bit activation and a 4-bit weight for a normal activation in one cycle in each of a plurality of normal calculation groups.

In this case, when a weight, together with a 4-bit activation, on which a convolution calculation is performed, is an 8-bit outlier weight, the neural network acceleration apparatus 10 may perform a convolution calculation between the upper 4 bits of the outlier weight and the 4-bit activation, may perform a convolution calculation between the lower 4 bits of the outlier weight and the 4-bit activation, and may obtain a final result value by summing the results of the calculations.

Figure 8:
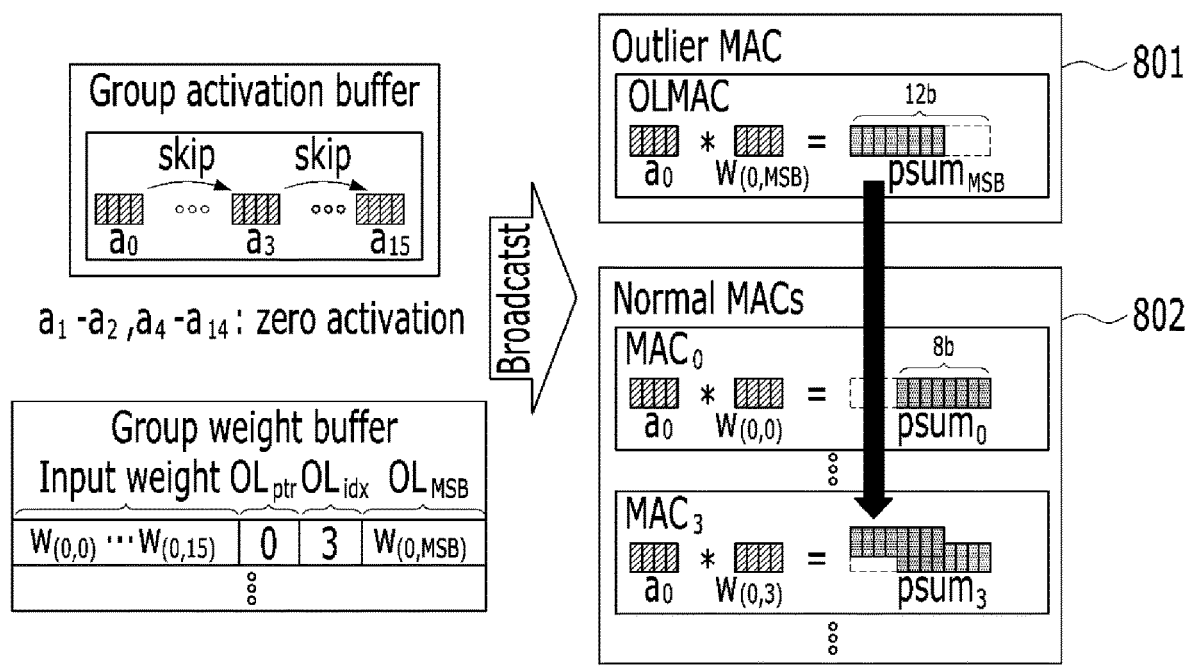

FIG. 8 is a view showing an example of an operation in one calculation group. Referring to this drawing, the neural network acceleration apparatus 10 may provide obtained 16 normal activation and 16 weights to 16 normal calculation units 802, which calculate normal activations, in the calculation group, and may perform convolution calculations between normal activations and normal weights obtained via the normal calculation units.

In this case, when an outlier weight is included in 16 weights, the neural network acceleration apparatus 10 may allocate the upper 4 bits of the outlier weight to an outlier calculation unit 801 in a calculation group and perform a convolution calculation between the upper 4 bits and a normal activation, and may allocate the lower 4 bits of the outlier weight to a normal calculation unit 802 and perform a convolution calculation between the lower 4 bits and the normal activation. Thereafter, the neural network acceleration apparatus 10 may calculate a final result by summing the calculation result of the outlier calculation unit and the calculation result of the normal calculation unit in two cycles.

Furthermore, the neural network acceleration apparatus 10 may store the calculation result in the cluster output tri-buffer.

According to another embodiment, when an outlier activation is input, the neural network acceleration apparatus 10 may calculate an outlier activation and a weight via an outlier calculation group.

For example, the neural network acceleration apparatus 10 may calculate a 16-bit activation, which is an outlier activation, and a weight by using a full-precision calculation unit.

Figure 9:
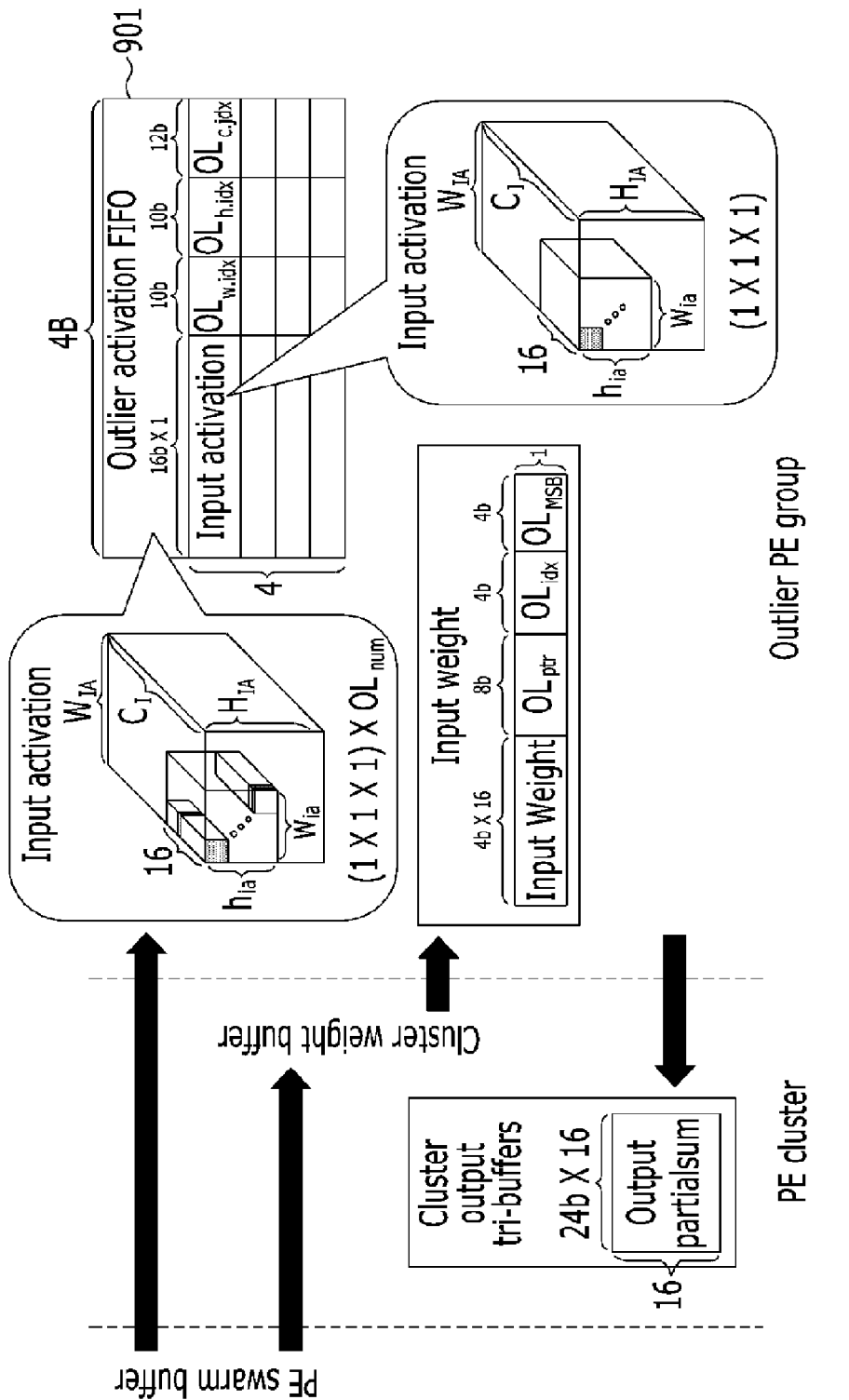

FIG. 9 is a view showing an example of a calculation group which calculates an outlier activation. Referring to this drawing, the neural network acceleration apparatus 10 may store an outlier activation, stored in a PE swarm buffer, in an outlier activation FIFO in the form of a table 901, and may perform convolution calculations using 16 full-precision calculation units using weights input from a cluster weight buffer.

In this case, when an outlier weight is input, the neural network acceleration apparatus 10 may calculate a final result by summing the result of a calculation between the upper 4 bits of the outlier weight and an outlier activation via an outlier full-precision calculation unit and the result of a calculation between the lower 4 bits of the outlier weight and the outlier activation via a normal full-precision calculation unit, as in the calculation between a normal activation and an outlier weight.

Furthermore, the neural network acceleration apparatus 10 may store a calculation result in a cluster output tri-buffer.

Thereafter, the neural network acceleration apparatus 10 may calculate a final result based on the calculation results of the normal calculation group and the outlier calculation group.

For example, the neural network acceleration apparatus 10 may obtain a final result by summing the results stored in the cluster output tri-buffers.

Figure 10:
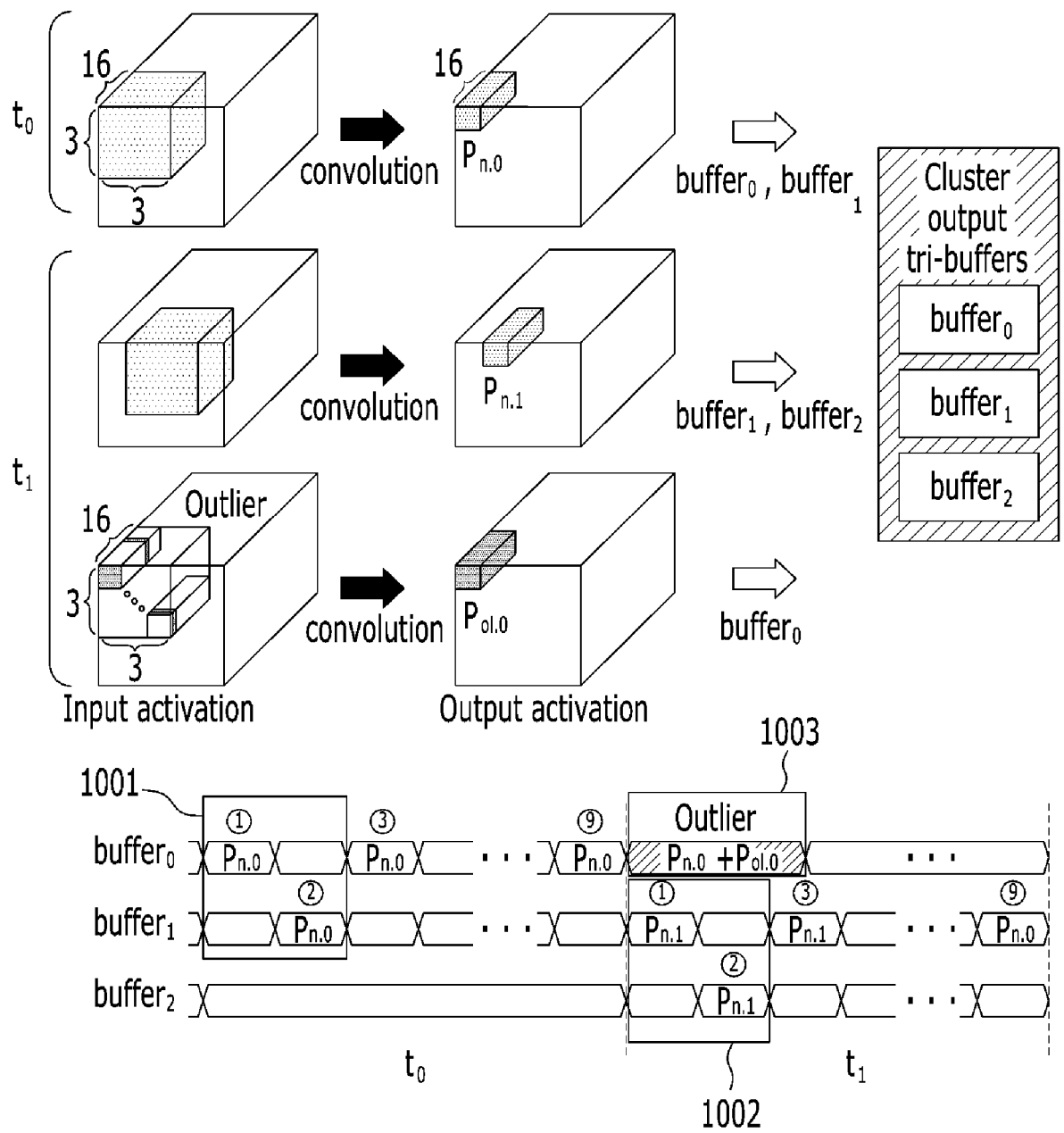

FIG. 10 is a view showing an example of a process of storing data in cluster output tri-buffers and calculating a final result. Referring to this drawing, the neural network acceleration apparatus 10 may access two buffers in a normal calculation group, add a new second result 1002 to a previously stored first result 1001, and store a result, and may calculate a final result 1003 by adding the calculation result of the outlier calculation group to the second result 1002.

As described above, different quantization methods are applied to data on the neural network by taking into consideration outlier data and quantized data is separated and then calculation is performed based on the number of bits of the data, and thus it is possible to reduce a computational load while maintaining the quality of an output result even using a small number of bits, thereby reducing the amount of data to be written to memory.

Figure 11:
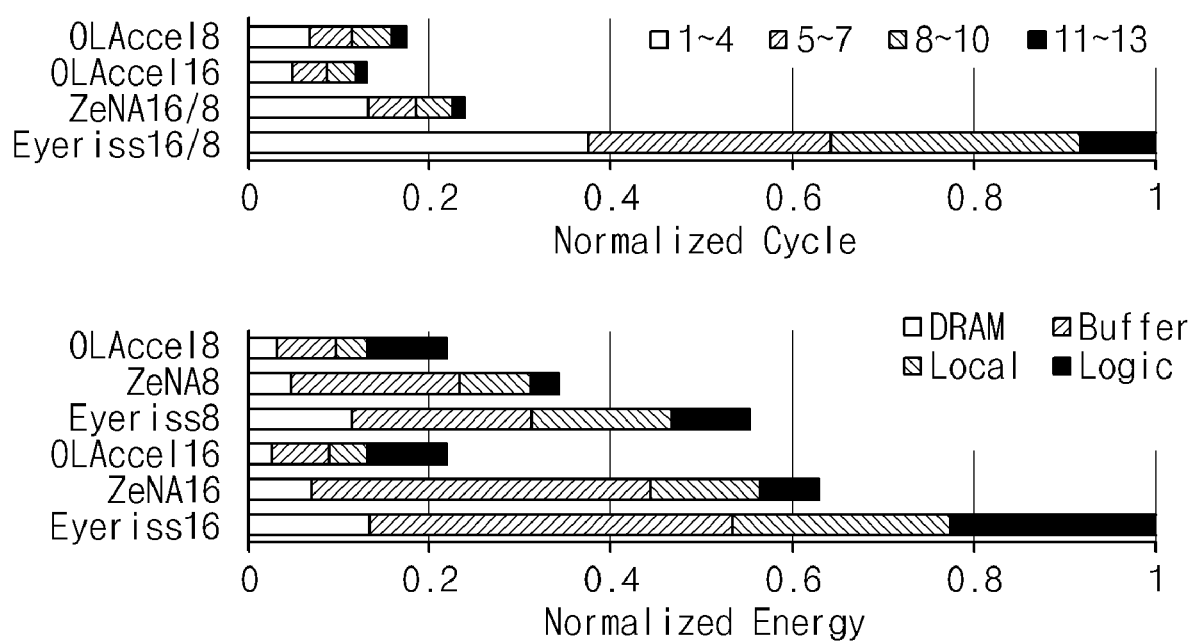
FIGS. 11 and 12 show the data of experiments on the performance of the neural network acceleration method according to an embodiment.
Figure 12:
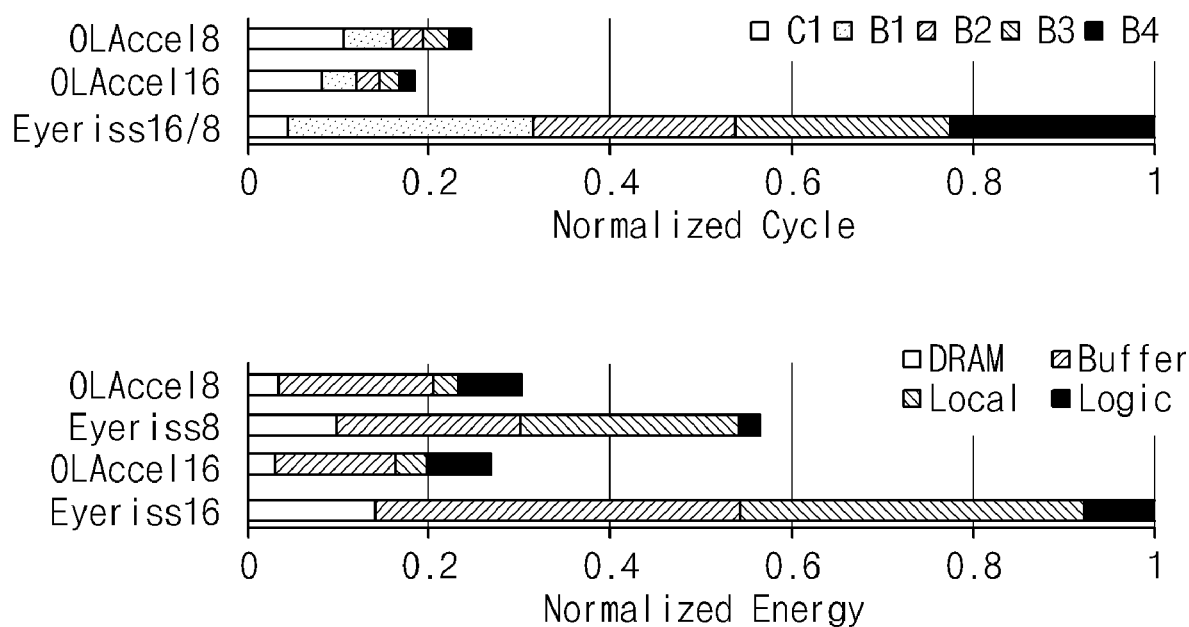

FIGS. 11 and 12 show the results of experiments to which the neural network acceleration method was applied. Referring to FIG. 11, the present invention was applied to VGG-16, which is a representative example of a deep neural network, and results obtained by comparison with conventional hardware accelerators are shown. As shown in the drawings, the 4-bit accelerator (an 8-bit outlier, OLAccel8) of the present invention enables 30% or more faster performance and a twice or more reduction in energy compared to the conventional 8-bit versions of Eyeriss and ZeNA.

Furthermore, referring to FIG. 12, there are shown the results of the comparison with the conventional hardware accelerator for ResNet-18 for ImageNet processing. In this case, ZeNA results were not present in existing papers, and thus only Eyeriss was compared. The 4-bit accelerator (an 8-bit outlier, OLAccel8) of the present invention achieved four times or more performance and a 40% or more reduction in energy compared to the 8-bit version of Eyeriss.

The present invention is a technology for reducing the size (the number of bits) of data in a deep neural network, and may be used for all types of performance and training of a neural network. Therefore, this technology is applicable to all the fields to which deep learning is applied.

The term 'unit' used in the above-described embodiments means software or a hardware component such as a field-programmable gate array (FPGA) or application-specific integrated circuit (ASIC), and a 'unit' performs a specific role. However, a 'unit' is not limited to software or hardware. A 'unit' may be configured to be present in an addressable storage medium, and also may be configured to run one or more processors. Accordingly, as an example, a 'unit' includes components, such as software components, object-oriented software components, class components and task components, processes, functions, attributes, procedures, subroutines, segments in program code, drivers, firmware, microcode, circuits, data, a database, data structures, tables, arrays, and variables.

Components and a function provided in 'unit(s)' may be coupled to a smaller number of components and 'unit(s)' or divided into a larger number of components and 'unit(s).'

In addition, components and 'unit(s)' may be implemented to run one or more CPUs in a device or secure multimedia card.

The neural network acceleration method according to the embodiment described in conjunction with FIG. 2 may be implemented in the form of a computer-readable medium that stores instructions and data that can be executed by a computer. In this case, the instructions and the data may be stored in the form of program code, and may generate a predetermined program module and perform a predetermined operation when executed by a processor. Furthermore, the computer-readable medium may be any type of available medium that can be accessed by a computer, and may include volatile, non-volatile, separable and non-separable media. Furthermore, the computer-readable medium may be a computer storage medium. The computer storage medium may include all volatile, non-volatile, separable and non-separable media that store information, such as computer-readable instructions, a data structure, a program module, or other data, and that are implemented using any method or technology. For example, the computer storage medium may be a magnetic storage medium such as an HDD, an SSD, or the like, an optical storage medium such as a CD, a DVD, a Blu-ray disk or the like, or memory included in a server that can be accessed over a network.

Furthermore, the neural network acceleration method according to the embodiment described in conjunction with FIG. 2 may be implemented as a computer program (or a computer program product) including computer-executable instructions. The computer program includes programmable machine instructions that are processed by a processor, and may be implemented as a high-level programming language, an object-oriented programming language, an assembly language, a machine language, or the like. Furthermore, the computer program may be stored in a tangible computer-readable storage medium (for example, memory, a hard disk, a magnetic/optical medium, a solid-state drive (SSD), or the like).

Accordingly, the neural network acceleration method according to the embodiment described in conjunction with FIG. 2 may be implemented in such a manner that the above-described computer program is executed by a computing apparatus. The computing apparatus may include at least some of a processor, memory, a storage device, a high-speed interface connected to memory and a high-speed expansion port, and a low-speed interface connected to a low-speed bus and a storage device. These individual components are connected using various buses, and may be mounted on a common motherboard or using another appropriate method.

In this case, the processor may process instructions within a computing apparatus. An example of the instructions is instructions which are stored in memory or a storage device in order to display graphic information for providing a Graphic User Interface (GUI) onto an external input/output device, such as a display connected to a high-speed interface. As another embodiment, a plurality of processors and/or a plurality of buses may be appropriately used along with a plurality of pieces of memory. Furthermore, the processor may be implemented as a chipset composed of chips including a plurality of independent analog and/or digital processors.

Furthermore, the memory stores information within the computing device. As an example, the memory may include a volatile memory unit or a set of the volatile memory units. As another example, the memory may include a non-volatile memory unit or a set of the non-volatile memory units. Furthermore, the memory may be another type of computer-readable medium, such as a magnetic or optical disk.

In addition, the storage device may provide a large storage space to the computing device. The storage device may be a computer-readable medium, or may be a configuration including such a computer-readable medium. For example, the storage device may also include devices within a storage area network (SAN) or other elements, and may be a floppy disk device, a hard disk device, an optical disk device, a tape device, flash memory, or a similar semiconductor memory device or array.

The above-described embodiments are intended for illustrative purposes. It will be understood that those having ordinary knowledge in the art to which the present invention pertains can easily make modifications and variations without changing the technical spirit and essential features of the present invention. Therefore, the above-described embodiments are illustrative and are not limitative in all aspects. For example, each component described as being in a single form may be practiced in a distributed form. In the same manner, components described as being in a distributed form may be practiced in an integrated form.

The scope of protection desired via the present specification should be defined by the attached claims, rather than the detailed description. All modifications and variations which can be derived from the meanings, scopes and equivalents of the claims should be construed as falling within the scope of the present invention.

INDUSTRIAL APPLICABILITY

The present invention relates to the method and apparatus for accelerating data processing in a neural network, and more specifically to the method and apparatus which vary quantization depending on the characteristic of data used in a neural network and separately perform calculation for respective pieces of differently quantized data, thereby accelerating data processing. Therefore, the neural network apparatus has industrial applicability.

The invention claimed is:

1. An apparatus for accelerating data processing on a neural network, the apparatus comprising:
   a control unit configured to quantize data by at least one method according to a characteristic of data calculated at a node forming at least one layer constituting the neural network, and to separately perform calculation at the node according to the quantized data; and
   memory configured to store the quantized data,
   wherein the data comprises an activation adapted to be output data at the node and a weight adapted to be an intensity at which the activation is reflected into the node; and
   the control unit classifies the activation as any one of an outlier activation larger than a preset number of bits and a normal activation equal to or smaller than the preset number of bits based on a number of bits representing a quantized activation.

2. The apparatus of claim 1, wherein the control unit determines the quantization method, to be applied to the data, based on a value of the data on the neural network.

3. The apparatus of claim 2, wherein the control unit varies a number of bits of data attributable to the quantization based on an error between the data and the quantized data.

4. The apparatus of claim 1, wherein the control unit separates the outlier activation and the normal activation from each other, and separately performs calculation on them.

5. The apparatus of claim 1, wherein the control unit stores at least one of the normal activation and the weight in a buffer.

6. The apparatus of claim 1, wherein the control unit, when an outlier weight, which is a weight larger than a preset number of bits, is present in the buffer, separates the outlier weight into a preset number of upper bits and remaining bits and then performs calculation.

7. A method for accelerating data processing on a neural network, the method comprising:
   quantizing data by at least one method according to a characteristic of data calculated at a node forming at least one layer constituting the neural network;
   storing the quantized data; and
   separately performing calculation at the node according to the quantized data,
   wherein the data comprises an activation adapted to be output data at the node and a weight adapted to be an intensity at which the activation is reflected into the node; and
   the method comprises classifying the activation as any one of an outlier activation larger than a preset number of bits and a normal activation equal to or smaller than the preset number of bits based on a number of bits representing a quantized activation.

8. The method of claim 7, wherein quantizing the data comprises determining the quantization method, to be applied to the data, based on a value of the data on the neural network.

9. The method of claim 8, wherein determining the quantization method comprises varying a number of bits of data attributable to the quantization based on an error between the data and the quantized data.

10. The method of claim 7, wherein separately performing the calculation comprises separating the outlier activation and the normal activation from each other and then performing calculation on them.

11. The method of claim 7, wherein performing the calculation at the node comprises storing at least one of the normal activation and the weight in a buffer.

12. The method of claim 7, further comprising, when an outlier weight, which is a weight larger than a preset number of bits, is present in the buffer, separating the outlier weight into a preset number of upper bits and remaining bits and then performing calculation.

13. A non-transitory computer-readable storage medium having stored thereon a program which performs the method set forth in claim 7.

14. A computer program stored in a non-transitory computer-readable storage medium such that a neural network acceleration apparatus performs the method set forth in claim 7.

* * * * *